United States Patent
Xu et al.

(10) Patent No.: US 10,173,534 B2
(45) Date of Patent: Jan. 8, 2019

(54) VARIABLE VOLTAGE CONVERTER CONTROL IN VEHICLES

(71) Applicant: Ford Global Technologies, LLC, Dearborn, MI (US)

(72) Inventors: Fan Xu, Novi, MI (US); Shuitao Yang, Dearborn Heights, MI (US); Yan Zhou, Canton, MI (US); Mohammed Khorshed Alam, Dearborn, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/404,537

(22) Filed: Jan. 12, 2017

(65) Prior Publication Data

US 2018/0194234 A1 Jul. 12, 2018

(51) Int. Cl.
| | |
|---|---|
| *H02J 7/14* | (2006.01) |
| *H02P 6/14* | (2016.01) |
| *H02P 9/00* | (2006.01) |
| *B60L 11/08* | (2006.01) |
| *B60L 11/18* | (2006.01) |
| *H02P 27/08* | (2006.01) |

(52) U.S. Cl.
CPC .......... *B60L 11/08* (2013.01); *B60L 11/1803* (2013.01); *B60L 11/1811* (2013.01); *H02J 7/1423* (2013.01); *H02P 6/14* (2013.01); *H02P 9/00* (2013.01); *H02P 27/08* (2013.01); *B60L 2210/10* (2013.01); *B60L 2210/14* (2013.01); *H02J 2007/143* (2013.01)

(58) Field of Classification Search
CPC ... B60L 11/08; B60L 11/1803; B60L 11/1811; B60L 2210/10; B60L 2210/14; H02J 7/14; H02P 6/14; H02P 9/00; H02P 27/08
USPC .................................................. 307/9.1, 10.1
See application file for complete search history.

(56) References Cited

U.S. PATENT DOCUMENTS

| | | | |
|---|---|---|---|
| 8,575,778 B2 | 11/2013 | Chen | |
| 9,088,224 B2 | 7/2015 | Chen | |
| 2014/0292347 A1 | 10/2014 | Chen | |
| 2016/0303995 A1* | 10/2016 | Lei | ........................ B60L 15/007 |

* cited by examiner

*Primary Examiner* — Hal Kaplan
(74) *Attorney, Agent, or Firm* — Brooks Kushman P.C.

(57) ABSTRACT

A vehicle power system may include a gate driver configured to drive a traction gate and a generator gate corresponding to switches of a variable voltage controller such that the gates have alternating pulse width modulation ON periods. The gates may be driven in response to a throughput magnitude falling below a threshold. The gate driver may be further configured to drive the gates such that a duty cycle of one of the gates is zero in response to the throughput exceeding the threshold.

20 Claims, 5 Drawing Sheets

VARIABLE VOLTAGE CONVERTER CONTROL IN VEHICLES

TECHNICAL FIELD

The present disclosure relates to variable voltage converter control in vehicles.

BACKGROUND

Electric vehicles may include a plurality of electric machines to generate torque and electricity. The electric machines may have inverters configured to convert direct current to alternating current. An electric vehicle with two electric machines may include two inverters. The inverters may have common rails. The rails may be supplied by a high voltage capacitor and a variable voltage converter (VVC). The VVC may be configured with switches that draw or feed electric power between the respective electric machines and a battery.

SUMMARY

A vehicle power system may include a gate driver configured to drive a traction gate and a generator gate corresponding to switches of a variable voltage converter such that the gates have alternating pulse width modulation ON periods. The gates may be driven in response to a throughput magnitude falling below a threshold. The gate driver may be further configured to drive the gates such that a duty cycle of one of the gates is zero in response to the throughput exceeding the threshold.

A vehicle may include a variable voltage converter (VVC) electrically coupled to a battery, a traction motor, and a generator. The VVC may have a voltage converter portion controlled by a gate driver. The gate driver may be configured to operate the gates of the switches in a combination switching mode such that a traction gate and a generator gate corresponding to switches of the variable voltage converter have alternating pulse width modulation ON periods. The gate driver may be configured to operate the gates of the switches in a generation switching mode such that a duty cycle of the traction gate is zero. The gate driver may operate in the generation switching mode in response to VVC power throughput recharging the battery. The gate driver may be configured to operate the gate driver in a traction switching mode such that a duty cycle of the generator gate is zero. The gate driver may operate the gates of the switches in the traction switching mode in response to VVC power throughput depleting the battery.

A vehicle power system may include a variable voltage converter configured to toggle switches associated with a traction mode and generator mode such that the switches have alternating pulse width modulation ON periods. The controller may toggle the switches in response to a throughput magnitude falling below a threshold. The controller may toggle the switches such that a duty cycle of one of the switches is zero. The controller may toggle the switches in response to the throughput exceeding the threshold.

DETAILED DESCRIPTION

Figure 1:
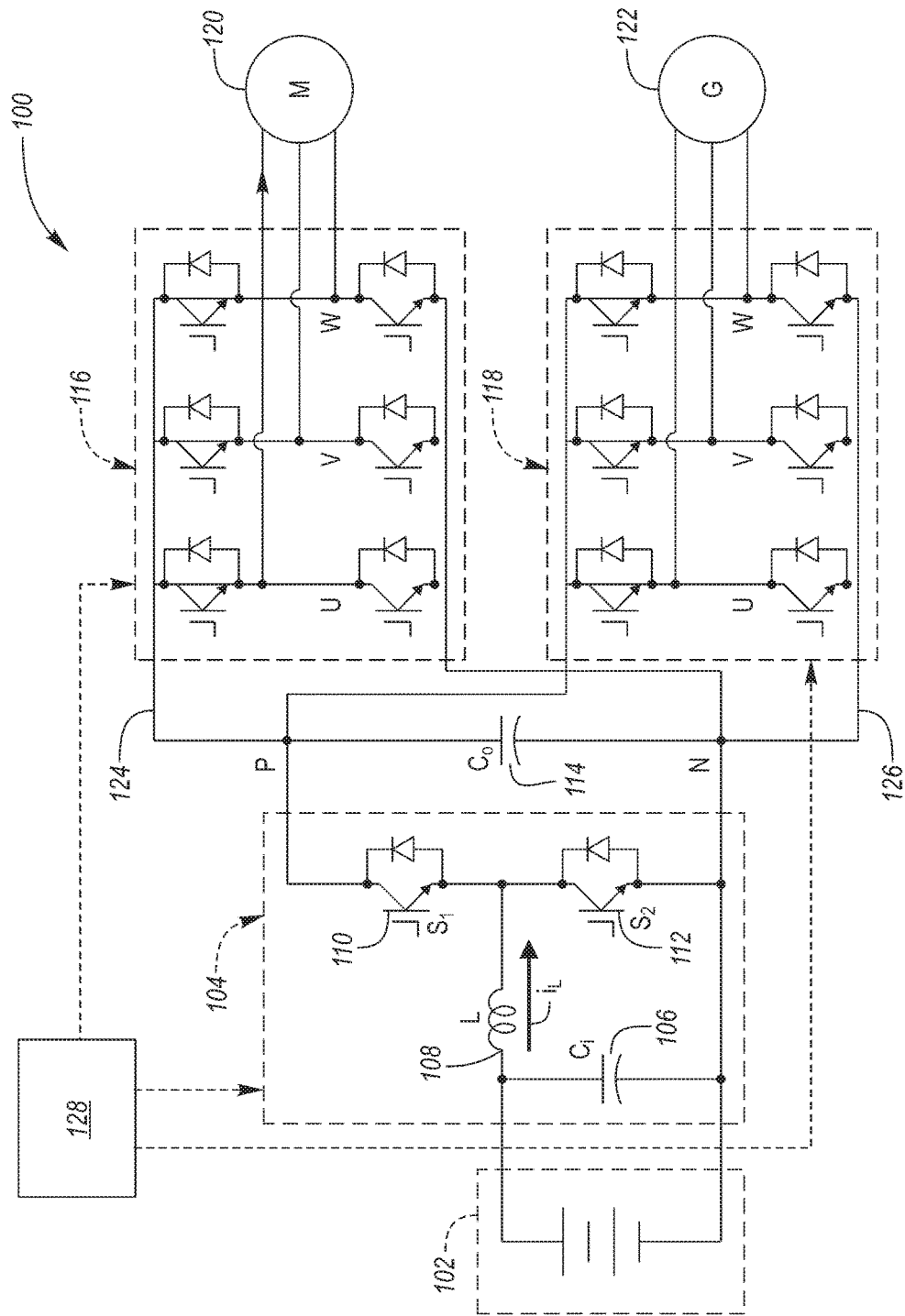
FIG. 1 is a schematic diagram of a vehicle electric drive system including inverters and a variable voltage converter.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles may include a plurality of electric machines to generate electricity and propel the vehicle. The electric machines may be connected to inverters configured to convert alternating current required by the machines to direct current required by the battery. The electric machines may be connected to common rails. The rails may be supplied by a high voltage capacitor and a variable voltage converter.

The variable voltage converter (VVC) may have an H-bridge or half H-bridge configuration. The switches of the VVC may serve to control the voltage of the rails. The switches may be driven by a pulse width modulation signal to establish the proper voltage on the rails. The pulse width modulation ON period may be alternated between switches such that current through the switches does not cross-conduct. A gap, dead period, or dead time may exist between the conducting ON periods of the switches to allow voltage to drain from the switch gates, which further prevents cross conduction. The dead time reduces the efficiency of the VVC, reducing control accuracy and imposing limitations on VVC capabilities. The removal of dead time allows for an increase in duty cycles available to the control system. For example, dead time may limit the maximum duty cycle to 90%. Removal of the dead time could allow the controller to operate the switch with a maximum duty cycle of 95%. Therefore, a larger range of voltages is able to be achieved by removing the dead time.

The aforementioned pulse width modulation ON periods may be preferred when the traction motor and generator are operated. If only the traction motor or generator is in use, the VVC may adjust the switching scheme to reduce switching losses by operating only one switch. Operation of a single VVC switch for a half-bridge or operation of one side of an H-bridge can provide a reduction in heat losses and remove a need for the dead time.

For example, the VVC gate driver or controller may be operated in a generating mode where a generator switch is operated at the same pulse width modulation duration or duty cycle, while the traction switch is set to a stagnant, OFF status. The generator switch may also have a varied pulse width modulation duty cycle or an increased pulse width modulation duty cycle due to the removal of the dead time.

Additionally, the VVC gate driver or controller may be operated in a traction mode where a traction switch is operated at the same pulse width modulation duration or duty cycle, while the generator switch is set to a stagnant, OFF status. The traction switch may also have a varied pulse width modulation duty cycle or an increased pulse width modulation duty cycle due to the removal of the dead time.

The entrance into one of the three modes may be based on a throughput magnitude of the VVC. The throughput magnitude may be based on an electrical parameter reading (e.g., voltage or current) through or across a resistor, capacitor, inductor, or combination thereof. For example, current through an inductor of the VVC may be measured to determine the current flowing through the VVC. The magnitude and sign of the current flow may determine the mode. Meaning, if the current is above a set threshold, the VVC may remove the dead time period and operate either the generator or traction switch or switches. The magnitude value may be set based on the maximum power rating of the motor, generator, or a combination thereof. For example, the motor may have a 1000 Watt capacity and the throughput may be 10% of that value or 100 Watts. The VVC may operate a particular switch or switch set based on the sign of the current flow. For example, if current flow is from the battery to the traction motor, the VVC may be operated in a traction mode. If current flow is from the generator to the battery, the VVC may be operated in a generator mode.

Referring now to FIG. 1, an electrical drive system 100 for a vehicle is shown. Although shown in a power-split configuration, the electrical drive system 100 configuration may be different. The electrical drive system 100 includes a traction battery 102 and VVC 104. The VVC 104 draws or feeds power to the battery 102 through a boost or buck-boost converter configuration. The converter 104 includes a capacitor 106 and inductor 108. Current flowing through the inductor, $i_L$, is fed to switches 110, 112. The switches 110, 112 may be operated in an alternating fashion to control the voltage across the output capacitor 114. The output capacitor 114 steadies the voltage of the common traction motor and generator inverter 116, 118 rails 124, 126. The motor inverter 116 includes a plurality of switches driven by a gate driver 128 to generate an alternating current from the output capacitor 114. The alternating current drives the traction motor 120. The generator inverter 118 converts energy created by the generator 122 to back-feed the battery 102 through the VVC 104.

Figure 2:
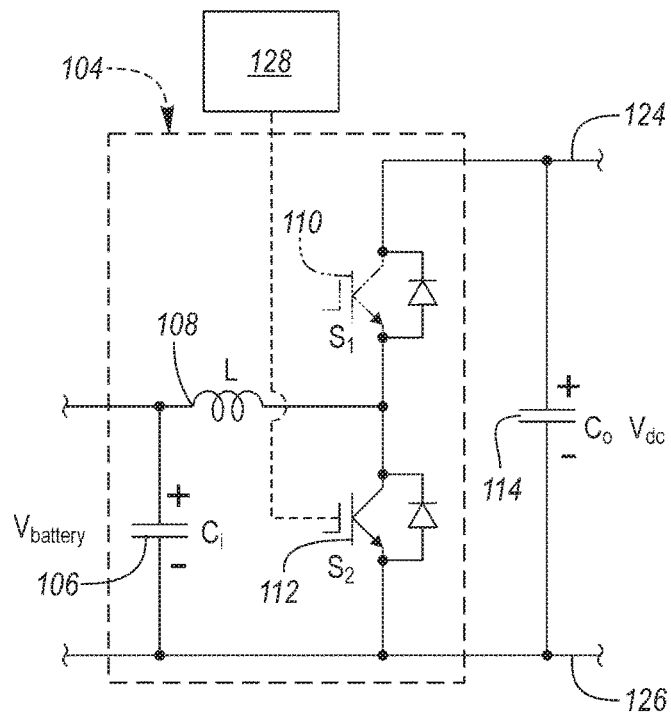
FIG. 2 is a schematic diagram of a variable voltage converter with a traction gate being held closed.

Referring now to FIG. 2, a VVC 104 operated in a traction mode is shown. As is known in the art, VVC IGBTs include a gate driver board 128 to drive gates of each switch. In the traction mode, the gate driver board is configured to drive the gates such that a duty cycle of one of the gates is zero. In other words, the pulse width of the gate driver signal is set to zero. The duty cycle of the operating switch 112 may be maintained such that the operation does not change after the threshold throughput is exceeded. The duty cycle may also be increased after the threshold is exceeded because the dead time required to prevent cross-conduction is no longer needed.

Figure 3:
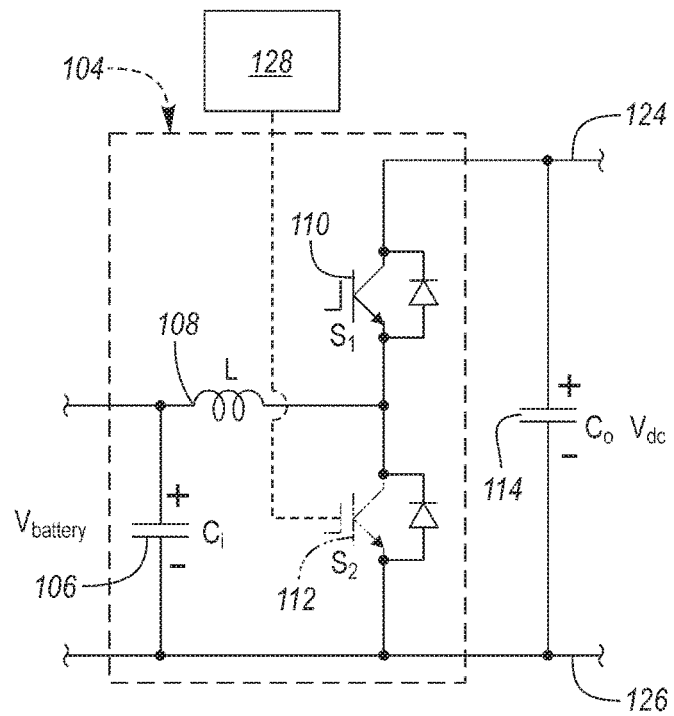
FIG. 3 is a schematic diagram of a variable voltage converter with a generator gate being held closed.

Referring now to FIG. 3, a VVC 104 operated in a generator mode is shown. As is known in the art, VVC IGBTs include a gate driver board 128 to drive gates of each switch. In the traction mode, the gate driver board is configured to drive the generator gate such that a duty cycle of one of the gates is zero. In other words, the pulse width is also set to zero. The duty cycle of the operating switch 110 may be maintained such that the operation does not change after the threshold throughput is exceeded. The duty cycle may also be increased after the threshold is exceeded because the dead time required to prevent cross-conduction is no longer needed.

Figure 4:
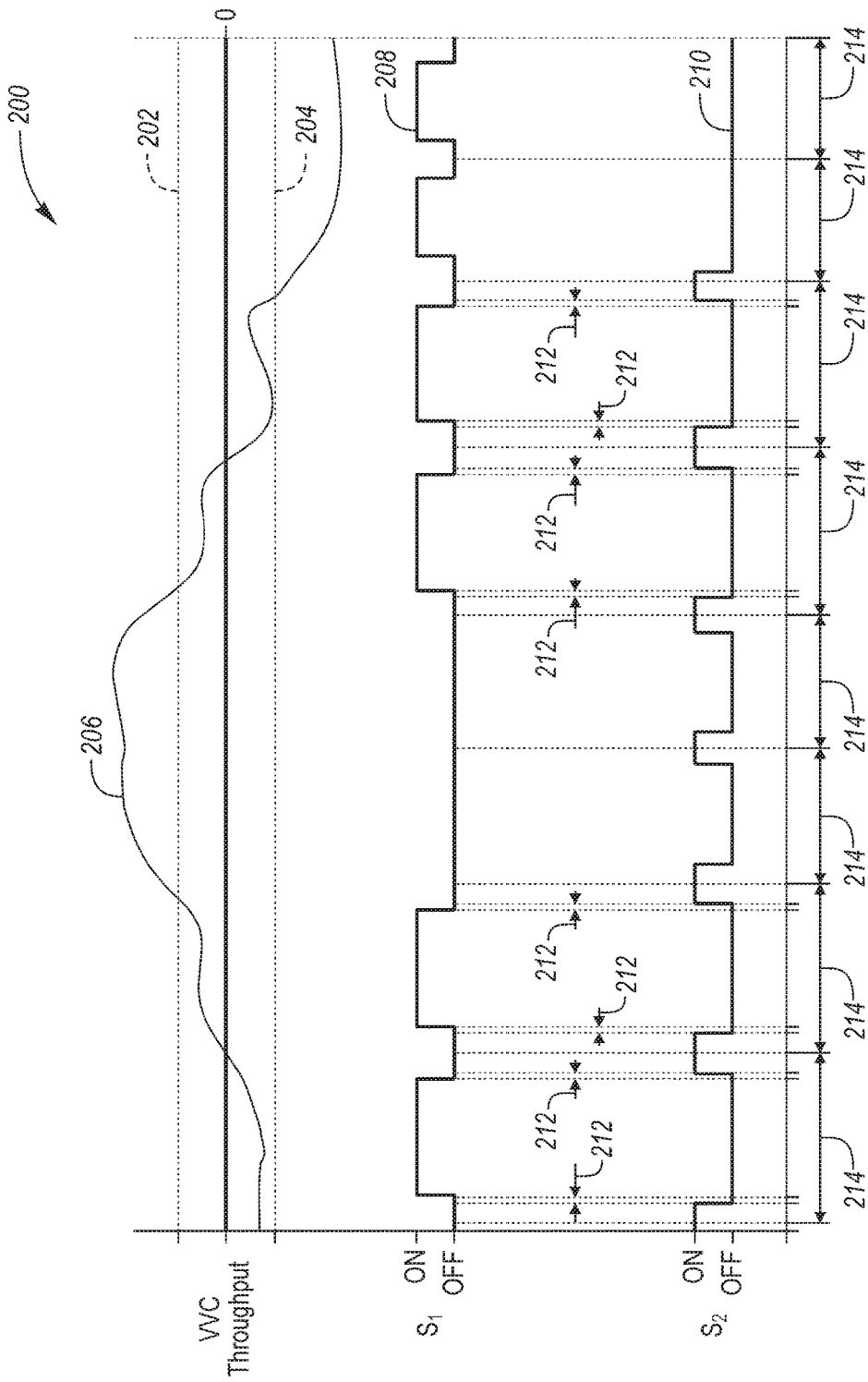
FIG. 4 is a timing diagram showing the gate or switch status during motoring, generating, and combination situations.

Referring now to FIG. 4, a timing diagram 200 is depicted. The diagram 200 includes a throughput curve 206 indicative of the VVC throughput. The VVC throughput 206 is depicted as the current flowing through the inductor of the VVC and can be measured, calculated, or indicated in other ways known to those with skill in the art. For example, the throughput could be calculated as an electrical current usage of the two motors. As an additional example, the throughput could be indicated by a state of charge calculation of the battery. Two thresholds 202, 204 indicating the point when a traction mode and generating mode is entered. The mode entered may depend on the sign of the throughput. For example, a positive throughput may require entrance into a traction switch mode, or a negative throughput may require entrance in to a generator switch mode. In other embodiments, the mode entered may depend on other inputs or other indicators.

Continuing with FIG. 4, pulse width modulation signals 208, 210 for each of the two switches S1, S2 are shown having a period 214 and dead time 212. As mentioned above, more switches may be used in various configurations to provide the traction mode and generator mode. As shown for S1 208, the pulse width modulation signal has a particular width when the VVC throughput 206 is within the thresholds 202, 204. The pulse width modulation signal for S2 210 is shorter in duration than S1 208 during the same period and provides a dead time 212 to prevent cross-conduction between the switches. The VVC throughput may exceed threshold 202 causing S1 to be turned OFF. Meaning, the gate of S2 210 has entered an isolated period where only S2 210 is operated. As is shown, the signal 208 pulse width is zero during these phases. Meaning, the duty cycle is zero. The gate driver signal of S2 210 may have a different pulse width or duty cycle while S1 is OFF.

Similarly, the pulse width modulation signal for S2 210 has a particular width when the VVC throughput 206 is within the thresholds 202, 204. The pulse width modulation signal for S2 210 is shorter in duration than S1 208 during the same period and provides a dead time 212 to prevent cross-conduction between the switches. The VVC throughput may exceed threshold 204 causing S2 to be turned OFF. Meaning, the gate of S1 208 has entered an isolated period where only S1 208 is operated. As is shown, the signal 210 pulse width is zero during these phases. Meaning, the duty cycle is zero. The gate driver signal of S2 210 may have a different pulse width or duty cycle while S1 is OFF.

Figure 5A:
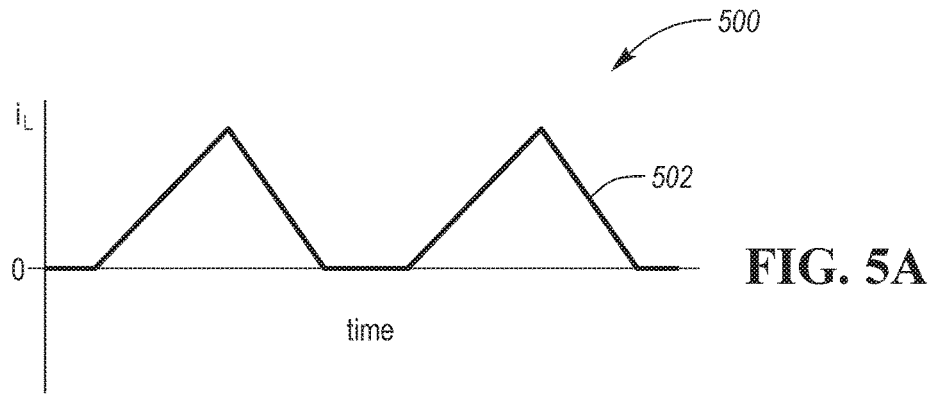
FIG. 5A is a diagram depicting inductor current during a motoring stage.
Figure 5B:
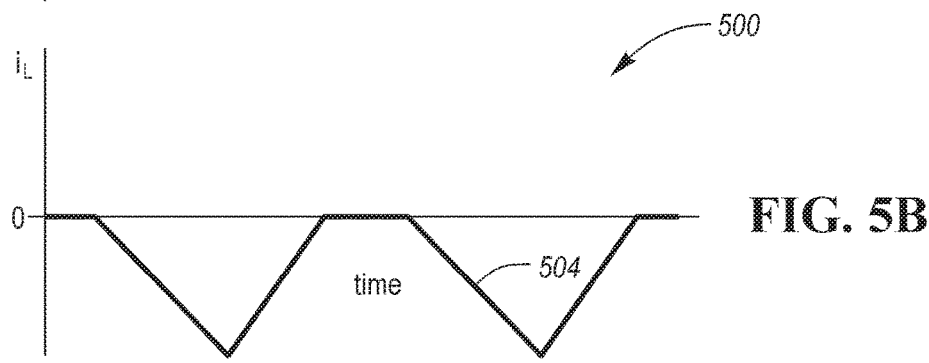
FIG. 5B is a diagram depicting inductor current during a generating stage.

Now referring to FIGS. 5A-B, graphs 500 of inductor currents 502, 504 are shown. In FIG. 5A, the inductor current does not have a negative component over time due to operation of only the traction switch, as described above. In FIG. 5B, the inductor current does not have a positive component over time due to operation of only the generator switch, as described above. The reduction of opposite currents improves the overall efficiency of the VVC and electrical drive system. Meaning, the prevention of a switch from changing state prevents a sign of current flow through an inductor of the VVC from changing.

Figure 6:
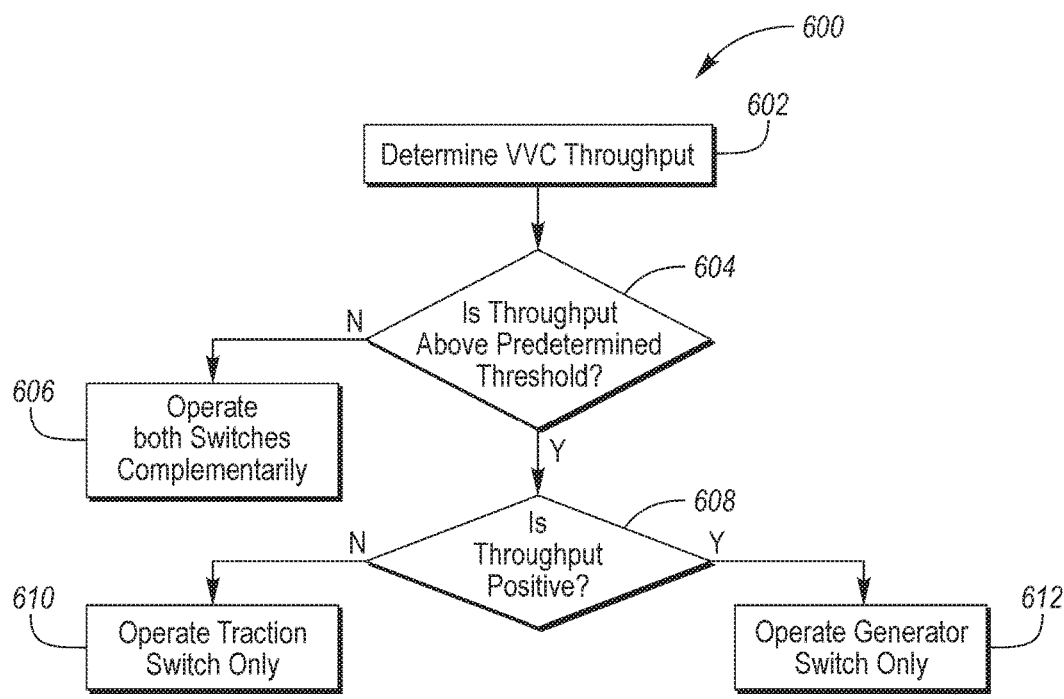
FIG. 6 is a flow diagram depicting the operation of a VVC.

Now referring to FIG. 6, a flow diagram 600 is shown. In step 602, the controller determines the throughput of the VVC. In step 604, the controller determines whether the throughput is less than the predetermined threshold. If the throughput is less than the predetermined threshold, the controller maintains the complementary, balanced, or combination switching mode in step 606. In step 608, the controller determines whether the throughput is positive or negative. Based on the sign of the throughput, the controller may individually operate the traction switch or operate the generator switch in steps 610, 612.

Figure 7:
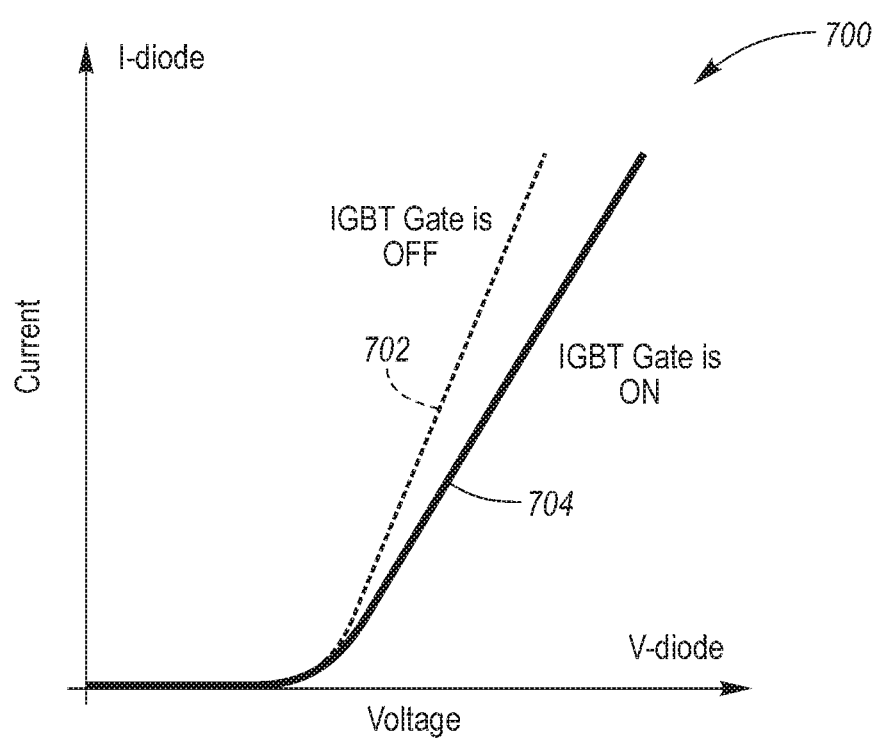
FIG. 7 is a graph showing the difference between the current consumed when the IGBT gate is ON and OFF.

Now referring to FIG. 7, a current-voltage graph 700 for different operating modes of the semiconducting switches is shown. Operating only one switch may reduce a voltage drop across the diode of the non-operating switch. During the traction mode or generation mode, the reverse conducting voltage drop, as shown in curve 702 and compared with the dual operation curve 704, across the diode associated with the non-operating IGBT can be reduced. This reduction leads to power savings. Although silicon diodes typically operate at about 0.7 volts, the voltage drop at higher currents is slight reduced when the IGBT gate is off. Therefore, the single switch operating modes lead to a reduced voltage drop and a reduction in energy consumption.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
a gate driver configured to, in response to a throughput magnitude falling below a threshold, drive a traction gate and a generator gate corresponding to switches of a variable voltage converter such that the gates have alternating pulse width modulation ON periods, and in response to the throughput exceeding the threshold, drive the gates such that a duty cycle of one of the gates is zero.

2. The vehicle of claim 1, wherein the throughput is based on power drawn from a battery by a motor electrically coupled through the variable voltage converter (VVC) and power fed to the battery by a generator electrically coupled through the VVC.

3. The vehicle of claim 2, wherein the threshold is based on a maximum power rating of the motor.

4. The vehicle of claim 2, wherein the threshold is based on a maximum power rating of the generator.

5. The vehicle of claim 2, wherein driving the gate such that a duty cycle of one of the gates is zero prevents a sign of current flow through an inductor of the VVC from changing.

6. The vehicle of claim 1, wherein the traction gate is the one of the gates when the throughput is negative.

7. The vehicle of claim 1, wherein the generator gate is the one of the gates when the throughput is positive.

8. The vehicle of claim 1, wherein the gate driver is further configured to set a duty cycle of the other of the gates in response to the throughput exceeding the threshold.

9. The vehicle of claim 1, wherein the gate driver is further configured to set a duty cycle of the one of the gates to an isolated period greater in duration than the ON period in response to the throughput exceeding the threshold.

10. The vehicle of claim 9, wherein the gate driver is further configured to set the duty cycle of the one of the gates to an isolated period equal to a sum of the ON period and a dead time between ON periods of the switches, in response to the throughput exceeding the threshold.

11. A vehicle comprising:
a variable voltage converter (VVC), electrically coupled to a battery, a traction motor, and a generator, having a voltage converter portion that includes switches controlled by a gate driver that is configured to:
in response to VVC power throughput being balanced, operate the switches in a combination switching mode such that a traction gate and a generator gate of the switches of the voltage converter portion have alternating pulse width modulation ON periods,
in response to VVC power throughput recharging the battery, operate the gate driver in a generation switching mode such that a duty cycle of the traction gate is zero, and
in response to VVC power throughput depleting the battery, operate the gate driver in a traction switching mode such that a duty cycle of the generator gate is zero.

12. The vehicle of claim 11, wherein the gate driver alternates between independent duty cycles for a traction gate and a generator gate in the combination switching mode.

13. The vehicle of claim 11, wherein the duty cycle of the traction gate is greater in duration than a corresponding ON period.

14. The vehicle of claim 13, wherein the duty cycle of the traction gate is equal to a sum of the corresponding ON period and a dead time associated with the corresponding ON period.

15. The vehicle of claim 11, wherein the duty cycle of the generation gate is greater in duration than a corresponding ON period.

16. The vehicle of claim 15, wherein the duty cycle of the generation gate is equal to a sum of the corresponding ON period and a dead time associated with the corresponding ON period.

17. The vehicle of claim 11, wherein the VVC power throughput being balanced is based on a power rating of the motor and the generator.

18. The vehicle of claim 17, wherein the VVC power throughput recharging the battery is based on a power rating of the motor and generator.

19. The vehicle of claim 17, wherein the VVC power throughput depleting the battery is based on a power rating of the motor and generator.

20. A vehicle power system comprising:
a variable voltage converter configured to, in response to a throughput magnitude falling below a threshold, toggle switches associated with a traction mode and generator mode such that the switches have alternating pulse width modulation ON periods, and in response to the throughput exceeding the threshold, toggle the switches such that a duty cycle of one of the switches is zero.

\* \* \* \* \*